United States Patent
Iijima et al.

(10) Patent No.: US 12,319,190 B2
(45) Date of Patent: Jun. 3, 2025

(54) DUMP TRUCK

(71) Applicant: Hitachi Construction Machinery Co., Ltd., Tokyo (JP)

(72) Inventors: Hideaki Iijima, Ibaraki (JP); Jun Ikeda, Ibaraki (JP); Kazunori Ishihara, Ibaraki (JP); Tatsuya Sugahara, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 141 days.

(21) Appl. No.: 17/908,290

(22) PCT Filed: Mar. 19, 2021

(86) PCT No.: PCT/JP2021/011386
§ 371 (c)(1),
(2) Date: Aug. 31, 2022

(87) PCT Pub. No.: WO2022/195852
PCT Pub. Date: Sep. 22, 2022

(65) Prior Publication Data
US 2024/0208389 A1    Jun. 27, 2024

(51) Int. Cl.
*B60P 1/16*    (2006.01)
*B60P 1/28*    (2006.01)

(52) U.S. Cl.
CPC ............. *B60P 1/162* (2013.01); *B60P 1/283* (2013.01)

(58) Field of Classification Search
CPC .... B60P 1/16; B60P 1/162; B60P 1/28; B60P 1/283

USPC ................. 298/17 R, 19 R, 22 R, 22 C, 22 P
See application file for complete search history.

(56) References Cited

U.S. PATENT DOCUMENTS 3,695,710 A * 10/1972 Cresci ..................... B60P 1/162
                                                        298/22 C
2012/0274121 A1* 11/2012 Minoshima ............. B60P 1/162
                                                        298/22 R

FOREIGN PATENT DOCUMENTS

| JP | 2005-98346 A | 4/2005 |
| JP | 2008-267565 A | 11/2008 |
| JP | 5027705 B2 | 9/2012 |

(Continued)

*Primary Examiner* — Stephen T Gordon
(74) *Attorney, Agent, or Firm* — Crowell & Moring LLP

(57) ABSTRACT

Provided is a dump truck capable of switching a destination of supply of hydraulic oil from a hoist cylinder to a fan motor at an appropriate time. A dump truck comprising: a hydraulic pump for discharging a hydraulic oil by a driving force of the engine; a hoist cylinder for raising and lowering a vessel by the hydraulic oil supplied from the hydraulic pump; a fan motor for driving a fan that supplies a radiator with cooling air by the hydraulic oil supplied from the hydraulic pump; a selector valve capable of being switched between a first position for supplying the hoist cylinder with the hydraulic oil discharged from the hydraulic pump and a second position for supplying the fan motor with the hydraulic oil; and a controller configured to, in a case where the selector valve is in the first position, determine whether an inflow pressure of the hydraulic oil flowing into the selector valve is less than a threshold value, and in a case of determining that the inflow pressure is less than the threshold value, switch the selector valve from the first position to the second position.

5 Claims, 7 Drawing Sheets

(56) References Cited

FOREIGN PATENT DOCUMENTS

WO     WO 2009/119277 A1    10/2009
WO     WO 2013/108575 A1     7/2013

\* cited by examiner

DUMP TRUCK

TECHNICAL FIELD

The present invention relates to a dump truck.

BACKGROUND ART

Conventionally, there has been known a dump truck including a vehicle body, an engine, a hydraulic pump for discharging hydraulic oil by using the driving force of the engine, a hoist cylinder for raising and lowering a vessel supported on the vehicle body, and a fan motor for driving a fan that supplies a radiator with cooling air.

In the dump truck configured as above, the vessel is raised and lowered mainly while the vehicle body is stopped, and the cooling air generated by the fan is required mainly while the vehicle body is traveling. In this respect, the dump truck disclosed in Patent Literature 1 includes a selector valve for switching a destination of supply of the hydraulic oil from the hoist cylinder to the fan motor upon seating of the vessel.

CITATION LIST

Patent Literature

Patent Literature 1: JP-B-5027705

SUMMARY OF INVENTION

Technical Problem

However, since the technique disclosed in Patent Literature 1 allows the selector valve to be switched only in a state where the vessel is seated, it is not necessarily possible to switch the destination of supply of the hydraulic oil at an appropriate time. Thus, the technique disclosed in Patent Literature 1 is not always so useful.

The present invention has been made in view of the circumstances above, and therefore, an object of the present invention is to provide a dump truck capable of switching a destination of supply of hydraulic oil between a hoist cylinder and a fan motor at an appropriate time.

Solution to Problem

In order to achieve the object described above, the present invention provides a dump truck comprising: a vehicle body; an engine; a hydraulic pump for discharging a hydraulic oil by a driving force of the engine; a vessel supported on the vehicle body so as to be raised and lowered; a hoist cylinder for raising and lowering the vessel by the hydraulic oil supplied from the hydraulic pump; a radiator for transferring heat between a cooling air and a coolant to be supplied to the engine; a fan motor for driving a fan that supplies the radiator with the cooling air by the hydraulic oil supplied from the hydraulic pump; a selector valve capable of being switched between positions of a first position for supplying the hoist cylinder with the hydraulic oil discharged from the hydraulic pump and a second position for supplying the fan motor with the hydraulic oil discharged from the hydraulic pump; and a controller configured to control the positions in the selector valve, wherein the controller is configured to: in a case where the selector valve is in the first position, determine whether an inflow pressure of the hydraulic oil flowing into the selector valve is less than a threshold value, and in a case of determining that the inflow pressure is less than the threshold value, switch the selector valve from the first position to the second position.

Advantageous Effects of Invention

According to the present invention, it is possible to switch a destination of supply of hydraulic oil between a hoist cylinder and a fan motor at an appropriate time. The problems, configurations, and advantageous effects other than those described above will be clarified by explanation of the embodiments below.

DESCRIPTION OF EMBODIMENTS

First Embodiment

Figure 1:
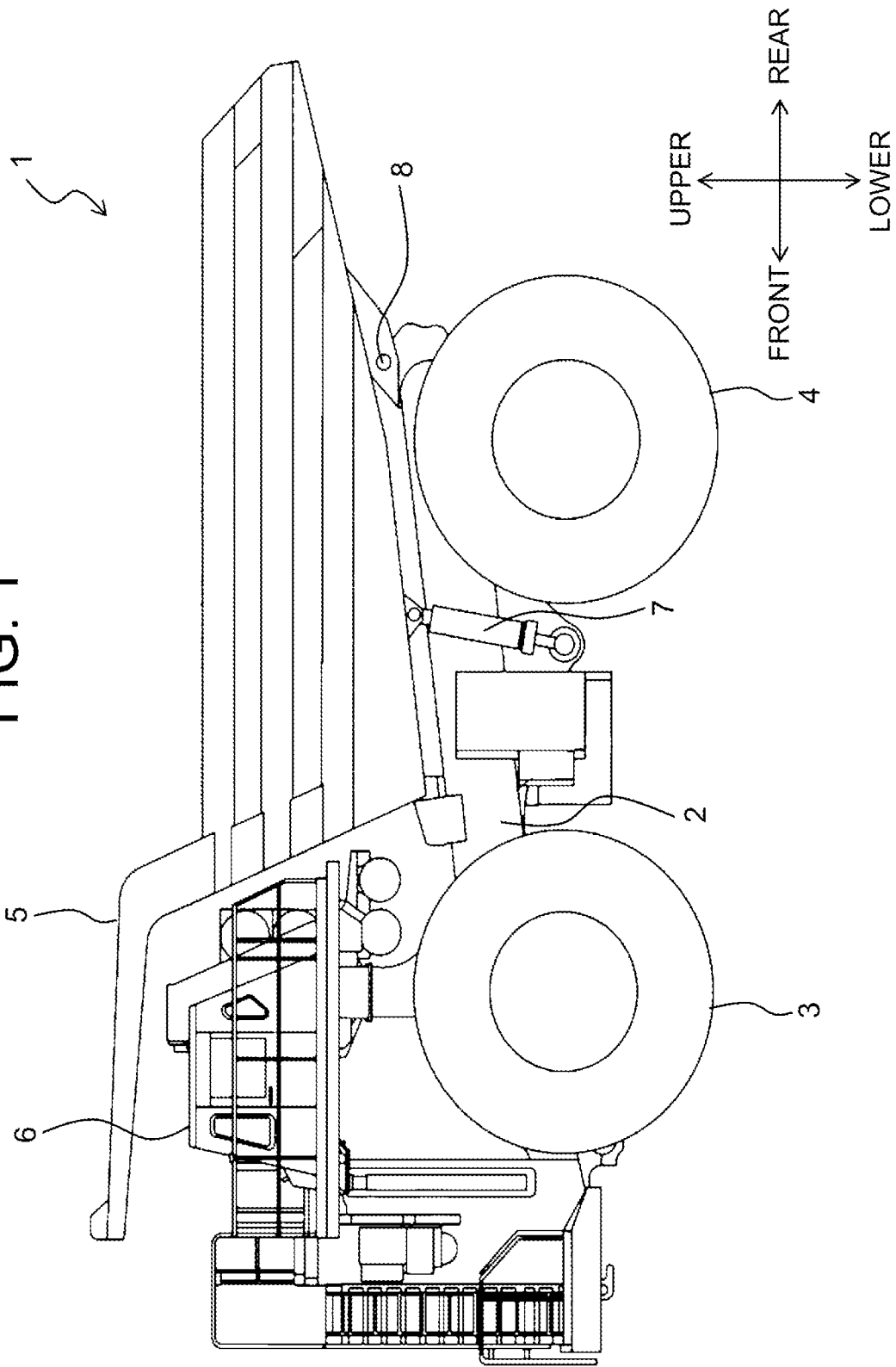
FIG. 1 is a side view of a dump truck.

Embodiments of a dump truck 1, which is one of the examples of a vehicle according to the present invention, will be described with reference to the drawings. FIG. 1 is a side view of the dump truck 1. In the present specification, the front, rear, left, and right are refereed based on the viewpoint of an operator who boards and operates the dump truck 1 unless otherwise noted.

As illustrated in FIG. 1, the dump truck 1 according to a first embodiment mainly includes a vehicle body frame (vehicle body) 2, a pair of front wheels 3 rotatably supported on the left and right ends of a front portion of the vehicle body frame 2, a pair of rear wheels 4 rotatably supported on the left and right ends of a rear portion of the vehicle body frame 2, a vessel 5 supported on the vehicle body frame 2 so as to be raised and lowered, and a cab 6 where the operator who operates the dump truck 1 boards.

The pair of front wheels 3 corresponds to steering wheels whose steering angles change in response to a steering operation by the operator. On the other hand, the pair of rear wheels 4 corresponds to driving wheels which receive the driving force of a traveling motor 17 (see FIG. 2) and rotate in response thereto. Note that the dump truck 1 includes the traveling motor 17 having a pair of traveling motors so as to transmit the driving force independently to each of the pair of rear wheels 4.

The vessel 5 is hinged at the rear portion of the vehicle body frame 2 via a hinge pin 8, and raised and lowered in the vertical direction in response to the extension and contraction of the hoist cylinder 7. The hoist cylinder 7 is a hydraulic cylinder for raising and lowering the vessel 5 by using the hydraulic oil supplied from a hydraulic pump 19 (see FIG. 2). One end of the hoist cylinder 7 is connected to the vehicle body frame 2, and the other end thereof is connected to the vessel 5. The hoist cylinder 7 is supplied with the hydraulic oil from the hydraulic pump 19, and thus extends and contracts in response thereto. The vessel 5 is raised when the hoist cylinder 7 extends, and lowered when the hoist cylinder 7 contracts.

The cab 6 is arranged at the left end of a deck which is provided on the front end of the vehicle body frame 2. Inside the cab 6, an internal space where the operator who operates the dump truck 1 can board is formed. In the internal space of the cab 6, a seat on which the operator can sit and an operation device to be operated by the operator sitting on the seat are arranged.

Figure 3:
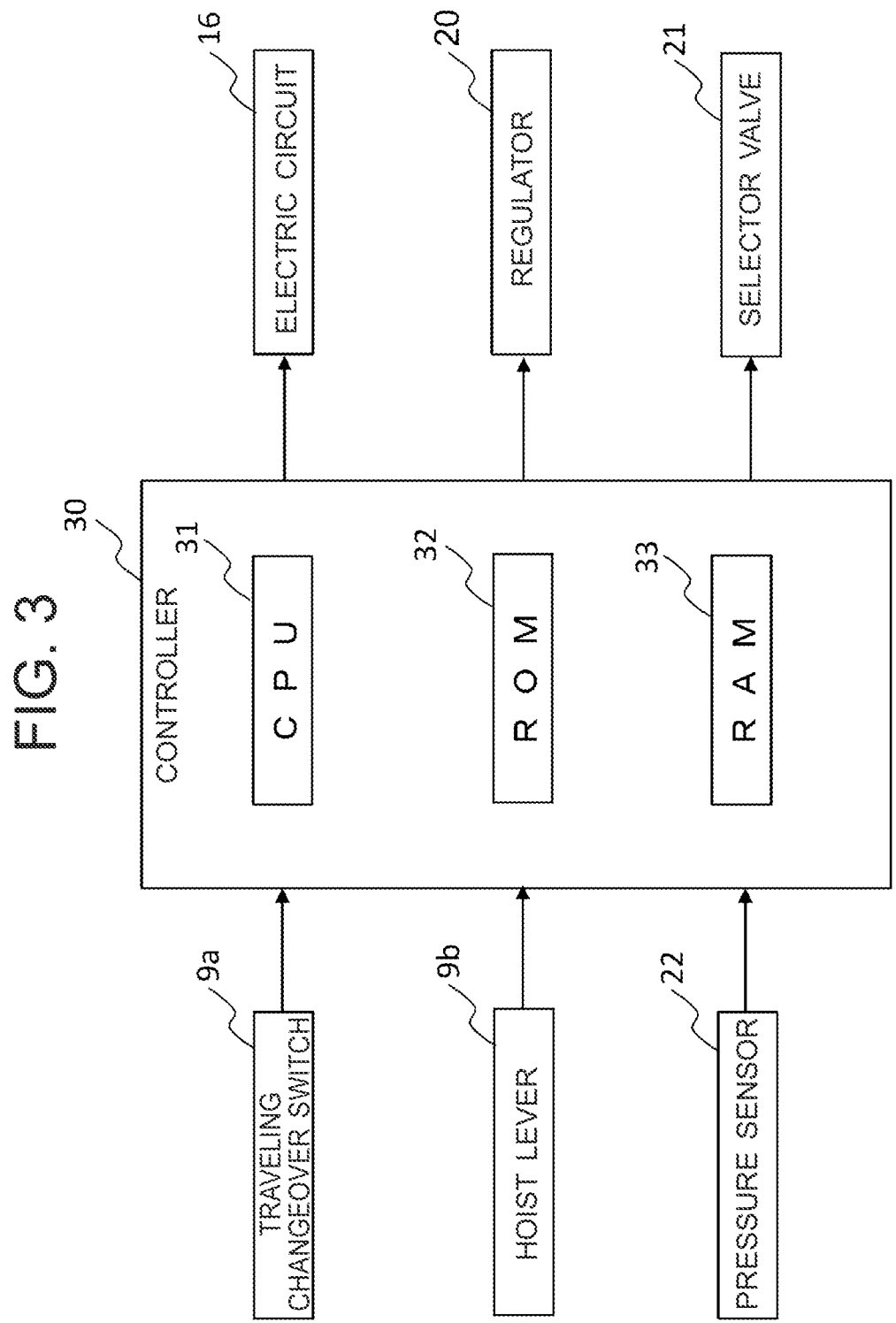
FIG. 3 is a hardware configuration diagram of a dump truck.

The operation device is configured to receive an operation for operating the dump truck 1 from the operator, and output an operation signal indicating the content of the received operation to a controller 30 (see FIG. 3). The operation device is operated by the operator, by which the vehicle body frame 2 travels and the vessel 5 goes up and down. In particular, the operation device may include, for example, a lever, a steering wheel, an accelerator pedal, a brake pedal, and a switch. The operation device includes a traveling changeover switch (traveling changeover device) 9a and a hoist lever (hoist operation device) 9b, which will be described later.

Figure 2:
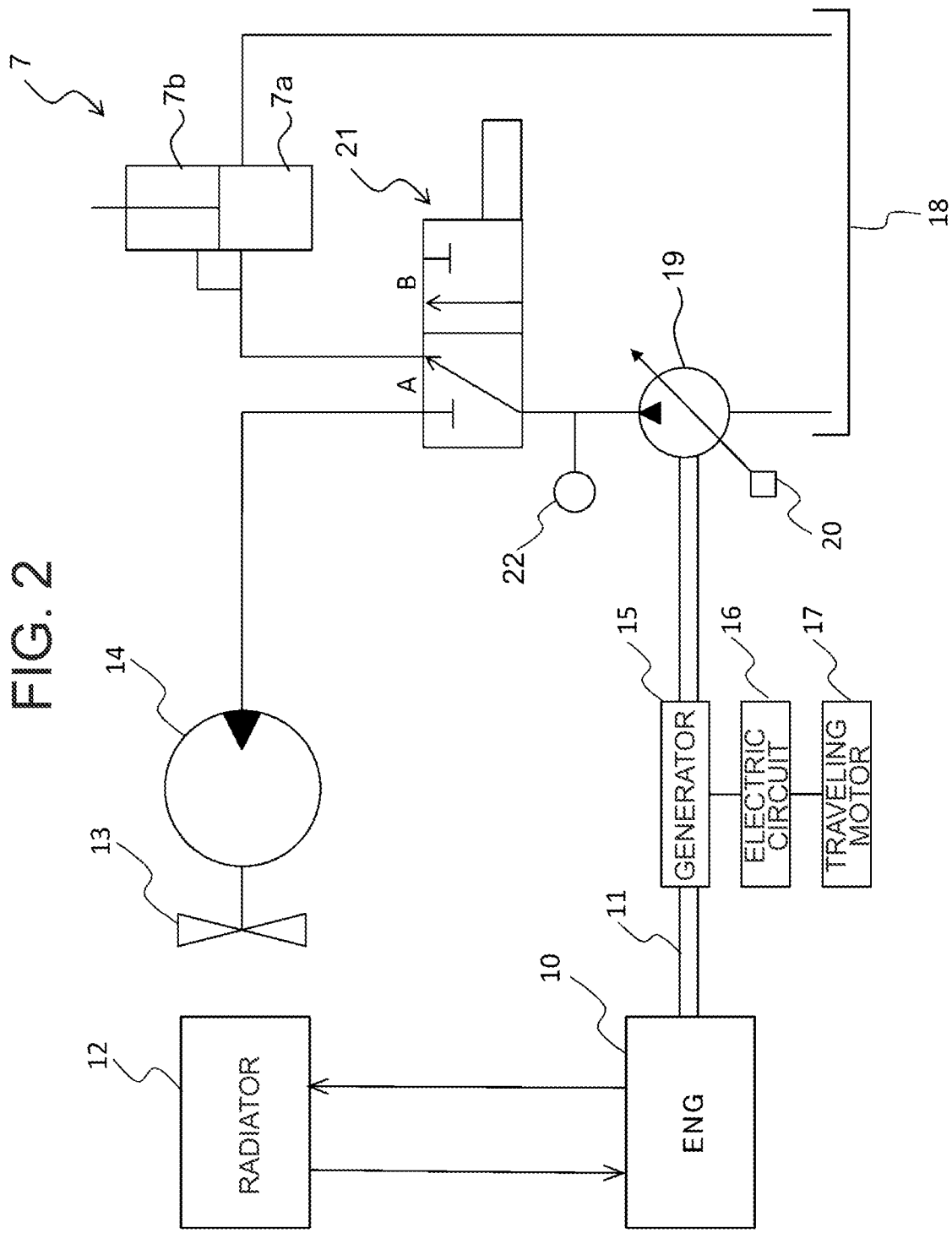
FIG. 2 illustrates a drive circuit of a dump truck.

FIG. 2 illustrates a drive circuit of the dump truck 1. As illustrated in FIG. 2, the dump truck 1 mainly includes an engine 10, a radiator 12, a fan 13, a fan motor 14, a generator 15, an electric circuit 16, the traveling motor 17, a hydraulic oil tank 18, the hydraulic pump 19, a regulator 20, a selector valve 21, and a pressure sensor 22.

The engine 10 generates the driving force for driving the dump truck 1. More specifically, the engine 10 mixes air and fuel for combustion so as to rotate an output shaft 11. Furthermore, the engine 10 generates heat when driving the dump truck 1. Accordingly, a coolant passage through which a coolant passes is formed inside the engine 10.

The radiator 12 supplies the coolant passage of the engine 10 with the coolant so that the heat can be transferred from the coolant discharged from the coolant passage of the engine 10 to the cooling air. The coolant cools the engine 10 while passing through the coolant passage. The fan 13 receives the driving force of the fan motor 14, and thus rotates to generate the cooling air. The radiator 12 is supplied with this cooling air, thereby enabling the heat transfer between the cooling air and the coolant. The fan motor 14 is a hydraulic motor which is supplied with the hydraulic oil from the hydraulic pump 19 and thus rotates the fan 13.

The generator 15 is connected to the output shaft 11 of the engine 10. The generator 15 generates power by the driving force of the engine 10, and supplies the traveling motor 17 with the generated power through the electric circuit 16. The electric circuit 16 supplies the traveling motor 17 with the power generated by the generator 15. The electric circuit 16 includes, for example, a converter for converting the AC power generated by the generator 15 to the DC power, a changeover switch for switching a direction of the power to be supplied to the traveling motor 17, and a shut-off switch for shutting off the supply of power to the traveling motor 17.

The traveling motor 17 is an electric motor that rotates by the power generated by the generator 15. More particularly, depending on the direction of the power supplied from the electric circuit 16, the traveling motor 17 can rotate normally so as to cause the vehicle body frame 2 to travel forward, and also can rotate reversely so as to cause the vehicle body frame 2 to travel in reverse.

The hydraulic oil tank 18 stores the hydraulic oil to be supplied to the hoist cylinder 7 and fan motor 14. The hydraulic pump 19 is connected to the output shaft 11 of the engine 10. The hydraulic pump 19 rotates by the driving force of the engine 10, and discharges the hydraulic oil stored in the hydraulic oil tank 18.

The hydraulic pump 19 is a variable displacement pump capable of changing the tilt in accordance with the control of the controller 30. The hydraulic pump 19 is, for example, a swash plate type or a swash shaft type pump in which the displacement volume is controlled in accordance with a tilting angle. Changing the tilt increases or decreases the amount of the hydraulic oil discharged from the hydraulic pump 19 (discharge capacity). The discharge capacity of the hydraulic pump 19 is adjusted by the regulator 20 which operates in accordance with a signal output from the controller 30.

The selector valve 21 is arranged on a flow path of the hydraulic oil which extends from the hydraulic pump 19 to the hoist cylinder 7 and the fan motor 14. The flow path of the hydraulic oil is formed by, for example, a metal pipe, a flexible hose, or a combination thereof. The selector valve 21 is configured to switch a destination of supply of the hydraulic oil discharged from the hydraulic pump 19 to one of the hoist cylinder 7 and the fan motor 14. The selector valve 21 is a solenoid valve capable of being switched between a position A (first position) and a position B (second position) in accordance with the control of the controller 30.

The initial position of the selector valve 21 is the position A. The selector valve 21 in the position A supplies the hoist cylinder 7 with the hydraulic oil discharged from the hydraulic pump 19. When the controller 30 applies control voltage to the selector valve 21, the selector valve 21 is switched from the position A to the position B. The selector valve 21 in the position B supplies the fan motor 14 with the hydraulic oil discharged from the hydraulic pump 19. When the controller 30 stops applying the control voltage to the selector valve 21, the selector valve 21 is switched from the position B to the position A again.

Furthermore, on the flow path of the hydraulic oil from the selector valve 21 to the hoist cylinder 7, various hydraulic components (not illustrated) are arranged. Such hydraulic components include, for example, a direction selector valve for switching the supply of the hydraulic oil from the selector valve 21 in the position A between a bottom chamber 7a of the hoist cylinder 7 and a rod chamber 7b thereof. The direction selector valve is, for example, a solenoid valve for switching a destination of supply of the hydraulic oil in accordance with the control voltage of the controller 30.

The pressure sensor 22 is connected to the flow path of the hydraulic oil from the hydraulic pump 19 to the selector valve 21. More specifically, the pressure sensor 22 is arranged at the downstream side of the flow of the hydraulic oil from the hydraulic pump 19 and also at the upstream side of the flow of the hydraulic fluid from the selector valve 21. The pressure sensor 22 detects a discharge pressure P of the hydraulic oil discharged from the hydraulic pump 19, and outputs a pressure signal indicating a detection result to the controller 30.

FIG. 3 is a hardware configuration diagram of the dump truck 1. The controller 30 includes a CPU (Central Processing Unit) 31, a ROM (Read Only Memory) 32, and a RAM (Random Access Memory) 33. The CPU 31 reads and executes a program code stored in the ROM 32, whereby the controller 30 implements the processing which will be described later. The RAM 33 is used as a work area during the execution of the program by the CPU 31.

However, the specific configuration of the controller 30 is not limited thereto, and may be implemented by hardware such as an ASIC (Application Specific Integrated Circuit) and FPGA (Field-Programmable Gate Array).

The controller 30 is configured to control the entire operations of the dump truck 1. More specifically, the controller 30 acquires the operation signal output from the operation device and the pressure signal output from the pressure sensor 22, and control the electric circuit 16, the regulator 20, and the selector valve 21 based on the various signals as acquired.

The traveling changeover switch 9a is operated by the operator, by which the traveling direction of the dump truck 1 is switched. The traveling changeover switch 9a is configured to be switchable between a forward position, a reverse position, and a neutral position. The traveling changeover switch 9a outputs an operation signal indicating the current lever position to the controller 30. Then, the controller 30 switches various switches of the electric circuit 16 based on the operation signal output from the traveling changeover switch 9a.

More particularly, when the traveling changeover switch 9a is in the forward position, the controller 30 supplies power for normally rotating the traveling motor 17. When the traveling changeover switch 9a is in the reverse position, the controller 30 supplies power for reversely rotating the traveling motor 17. When the traveling changeover switch 9a is in the neutral position, the controller 30 stops supplying power to the traveling motor 17. The forward position and reverse position are ones of examples of a traveling position for supplying the traveling motor 17 with power.

The hoist lever 9b is operated by the operator, by which the hoist cylinder 7 extends and contracts. More specifically, the hoist lever 9b is configured to be switchable between an up position, a down position, a hold position, and a float position. The hoist lever 9b outputs an operation signal indicating the current lever position to the controller 30. Then, the controller 30 controls the supply and discharge of the hydraulic oil to and from the hoist cylinder 7 based on the operation signal output from the hoist lever 9b.

When the hoist lever 9b is in the up position, the controller 30 controls such that the hydraulic oil is supplied to the bottom chamber 7a of the hoist cylinder 7 and the hydraulic oil in the rod chamber 7b is discharged to the hydraulic oil tank 18. This causes the hoist cylinder 7 to extend. When the hoist lever 9b is in the down position, the controller 30 controls such that the hydraulic oil is supplied to the rod chamber 7b and the hydraulic oil in the bottom chamber 7a is discharged to the hydraulic oil tank 18. This causes the hoist cylinder 7 to contract.

When the hoist lever 9b is in the hold position, the controller 30 stops the supply of the hydraulic oil to the hoist cylinder 7 and prevents the hydraulic oil from being discharged from the bottom chamber 7a and rod chamber 7b. This causes the hoist cylinder 7 to be held in the current position. When the hoist lever 9b is in the float position, the controller 30 stops the supply of the hydraulic oil to the hoist cylinder 7 and connects the bottom chamber 7a and rod chamber 7b to the hydraulic oil tank 18. This causes the vessel 5 to go down by its own weight of the vessel 5 (in other words, the hoist cylinder 7 contracts).

When the traveling changeover switch 9a is in the forward position or the reverse position, the controller 30 outputs a signal for setting the discharge capacity of the hydraulic pump 19 to a maximum value (MAX) to the regulator 20. On the other hand, when the traveling changeover switch 9a is in the neutral position, the controller 30 controls the discharge capacity of the hydraulic pump 19 in accordance with the position of the hoist lever 9b. More particularly, when the hoist lever 9b is in the up position or the down position, the controller 30 outputs a signal for setting the discharge capacity of the hydraulic pump 19 to the maximum value to the regulator 20. On the other hand, when the hoist lever 9b is in the hold position or the float position, the controller 30 outputs a signal for setting the discharge capacity of the hydraulic pump 19 to a minimum value (MIN) to the regulator 20. The minimum value of the discharge capacity is, for example, 0.

Figure 4:
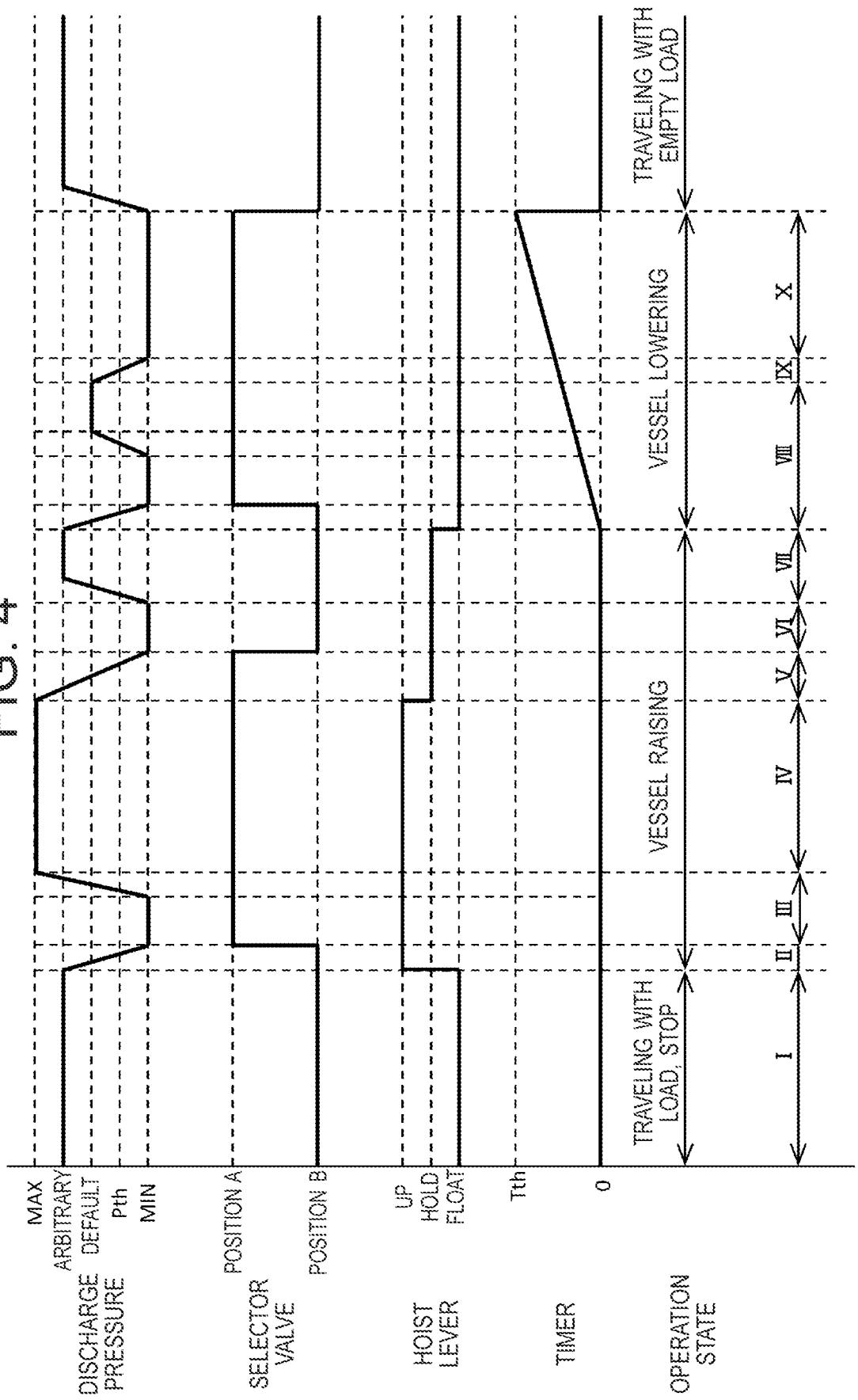
FIG. 4 illustrates operation states of a dump truck according to a first embodiment.

Next, with reference to FIG. 4, typical operations of the dump truck 1 will be described. FIG. 4 illustrates operation states of the dump truck 1 according to the first embodiment. As illustrated in FIG. 4, in periods I to II, the dump truck 1 loads a material (typically, earth and sand) into the vessel 5 at a loading site, and travels to a dumping site with the earth and sand disposed on the vessel 5 (traveling with load operation). In periods III to VII, the dump truck 1 dumps the earth and sand from the vessel 5 at the dumping site (vessel raising operation), and in periods VIII to X, causes the vessel 5 to be seated (vessel lowering operation) and travels to the loading site with the vessel 5 being empty (traveling with empty load operation).

In the dump truck 1 during the traveling with load operation, for example, the traveling changeover switch 9a is in the forward position, the hoist lever 9b is in the float position, the selector valve 21 is in the position B, and the discharge capacity of the hydraulic pump 19 is set to the maximum value. This allows the dump truck 1 to travel toward the dumping site, the hydraulic oil discharged from the hydraulic pump 19 to be supplied to the fan motor 14, and the fan 13 to generate cooling air.

More specifically, in the period I, the dump truck 1 travels toward the dumping site with the earth and sand disposed thereon. A calorific value of the engine 10 varies with a load exerted thereto such as during traveling on a slope, and accordingly, it is necessary to change the rotational speed of the fan 13 in accordance therewith, and by which the discharge pressure of the hydraulic pump 19 also changes. Next, when the dump truck 1 arrives at the dumping site, in the period II, the operator switches the traveling changeover switch 9a to the neutral position, and then switches the hoist lever 9b from the float position to the up position. This decreases the tilt of the hydraulic pump 19 over time, with which the discharge pressure changes to MIN. Thereafter, the selector valve 21 is switched from the position B to the position A.

Thereafter, in the period III, after a predetermined time has elapsed, the pump tilt increases over time, with which the discharge pressure changes to MAX. That is, the hydraulic oil discharged from the hydraulic pump 19 is supplied to the bottom chamber 7a of the hoist cylinder 7. As a result, in the period IV, the vessel 5 is raised, which causes the earth and sand disposed on the vessel 5 to be dumped.

Next, in the period V, the operator switches the hoist lever 9b from the up position to the hold position in order to hold the vessel 5 which has been raised. This decreases the tilt of the hydraulic pump 19 over time, with which the discharge pressure changes to MIN. Thereafter, the selector valve 21 is switched from the position A to the position B.

The period VI corresponds to a standby time before the fan 13 is driven. Next, in the period VII, if the hoist lever 9b remains in the hold position, based on a request from the engine 10, the tilt of the hydraulic pump 19 increases over time to drive the fan 13. In accordance therewith, the discharge pressure of the hydraulic pump 19 increases to an arbitrary value, whereby the fan 13 is driven.

Next, the operator switches the hoist lever 9b from the hold position to the float position at the time when the dumping operation is completed, by which the vessel 5 which has been raised starts going down by its own weight. More specifically, in the period VIII, a timer is started when the operator switches the hoist lever 9b from the holding position to the float position in order to lower the vessel 5. Furthermore, the tilt of the hydraulic pump 19 decreases over time, with which the discharge pressure changes to MIN. Thereafter, the selector valve 21 is switched from the position B to the position A.

Next, the operator switches the traveling changeover switch 9a to the forward position before and after the vessel 5 has been completely lowered (seated), by which the traveling motor 17 starts normally rotating. As a result, the dump truck 1 starts traveling toward the loading site, and the selector valve 21 is switched from the position A to the position B in accordance with the hydraulic control processing which will be described later. This causes the hydraulic oil discharged from the hydraulic pump 19 to be supplied to the fan motor 14, whereby the fan 13 generates cooling air.

More specifically, in the term VIII, in the case where the vessel 5 goes down slowly, the pump tilt increases automatically, with which the discharge pressure changes to a default value to accelerate the lowering of the vessel 5. Thereafter, in the period IX, as the vessel 5 lowers and is close to being seated, the tilt of the hydraulic pump 19 decreases over time, with which the discharge pressure changes to MIN. Then, in the period X, in the case where a value of the timer is equal to or more than a threshold value ($T_{th}$) and the discharge pressure is equal to or less than a threshold value ($P_{th}$), the selector valve 21 is switched from the position A to the position B.

Figure 5:
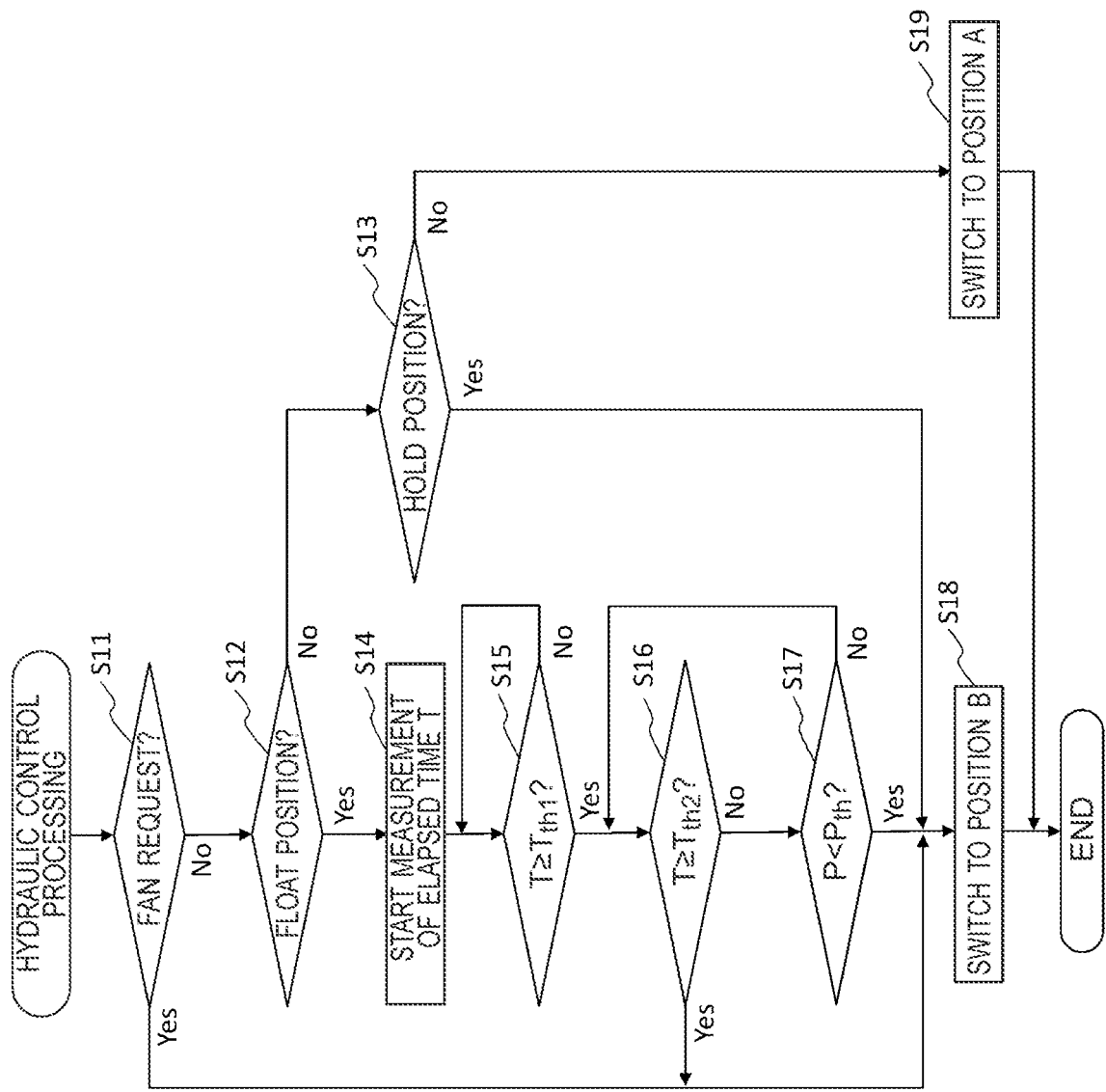
FIG. 5 illustrates a flowchart of hydraulic control processing according to the first embodiment.

Next, with reference to FIG. 5, the hydraulic control processing according to the first embodiment will be described. FIG. 5 is a flowchart of the hydraulic control processing according to the first embodiment. The hydraulic control processing is processing for switching the discharge capacity of the hydraulic pump 19 and the position of the selector valve 21 depending on the operation states of the dump truck 1. The controller 30 repeatedly executes the hydraulic control processing at predetermined time intervals, for example, while the engine 10 is running.

Firstly, the controller 30 determines whether there is a fan request (step S11). The fan request is made in the case where the radiator 12 needs to be supplied with cooling air, typically, for example, while the dump truck 1 is traveling with a load or traveling with an empty load. The controller 30 according to the first embodiment determines that there is a fan request in the case where, for example, the traveling changeover switch 9a is in the forward position or the reverse position.

In the case of determining that there is a fan request (step S11: Yes), the controller 30 switches the selector valve 21 from the position A to the position B (step S18). Furthermore, the controller 30 sets the discharge capacity of the hydraulic pump 19 to an arbitrary value in accordance with the fan request. Here, in the case where the selector valve 21 is already in the position B, the execution of step S18 is omitted.

Note that the method of determining whether there is a fan request is not limited to the example described above. As a further example, the controller 30 may be configured to determine the presence of a fan request in the case where the rotational speed of the engine 10 detected by a rotational speed sensor (not illustrated) is equal to or more than a threshold rotational speed. Furthermore, for example, the controller 30 may be configured to determine the presence of a fan request in the case where the temperature of the engine 10 detected by a temperature sensor (not illustrated) is equal to or more than a threshold temperature.

On the other hand, in the case of determining that there is no fan request (step S11: No), the controller 30 determines on which positions the hoist lever 9b is placed (step S12, step S13). In the case of determining that the hoist lever 9b is in the hold position (step S12: No & step S13: Yes), the controller 30 executes the process in step S18. Placing the hoist lever 9b in the hold position is assumed to be performed, for example, to let the dump truck 1 travel for a short distance with the vessel 5 kept raised.

In the case where the hoist lever 9b is in the up position or the down position (step S12: No & step S13: No), the controller 30 switches the selector valve 21 from the position B to the position A (step S19). Furthermore, the controller 30 sets the discharge capacity of the hydraulic pump 19 to the maximum value. Here, in the case where the selector valve 21 is already in the position A, the execution of step S19 is omitted. Placing the hoist lever 9b in the up position is assumed to correspond to the vessel raising operation, and placing the hoist lever 9b in the down position is assumed to correspond to an initial stage of the vessel lowering operation in the case where the vessel 5 cannot be lowered by its own weight due to dumping at a slope.

In the case where the hoist lever 9b is in the float position (step S12: Yes), the controller 30 sets the discharge capacity of the hydraulic pump 19 to the minimum value, and also executes the process of step S14 and later. Switching the hoist lever 9b to the float position is assumed to be performed in order to let the vessel 5 go down by its own weight.

However, switching the selector valve 21 while a pump discharge pressure of the hydraulic oil flowing into the selector valve 21 (hereinafter, referred to as a "pump pressure") is large may cause damages to the hydraulic components placed around the selector valve 21 (for example, a cap of a hose connected to the selector valve 21, etc.). Accordingly, the controller 30 switches the selector valve 21 after the pump pressure sufficiently decreases. More particularly, the controller 30 switches the selector valve 21 from the position A to the position B after determining that the pump pressure is less than a threshold value.

The controller 30 starts measuring an elapsed time T after determining that the hoist lever 9b is in the float position (step S14). Then, the controller 30 waits for execution of step S15 and later until the elapsed time T reaches a first threshold time $T_{th1}$ (step S15: No). The first threshold time $T_{th1}$ is set to a time required for the vessel 5 to be seated after the vessel 5 starts going down by its own weight (for example, 30 seconds). In other words, the first threshold time $T_{th1}$ is set to a time required for the pump pressure flowing into the selector valve 21 to be less than the threshold value after the discharge capacity of the hydraulic pump 19 is switched to the minimum value.

Next, in the case where the elapsed time T reaches the first threshold time $T_{th1}$ (step S15: Yes), the controller 30 waits for execution of step S18 until the elapsed time T reaches a second threshold time $T_{th2}$, or until the discharge pressure P detected by the pressure sensor 22 is less than the threshold pressure $P_{th}$ (step S16: No & step S17: No). The second threshold time $T_{th2}$ is a time longer than the first threshold time $T_{th1}$ (for example, 70 seconds), and for example, is a time until the pump pressure flowing into the selector valve 21 certainly falls below the threshold.

In the case where the elapsed time T is equal to or more than the first threshold time $T_{th1}$ and less than the second threshold time $T_{th2}$, and also the discharge pressure P is less than the threshold pressure $P_{th}$ (step S15: Yes & step S16: No & step S17: Yes), the controller 30 determines that the pump pressure flowing into the selector valve 21 is less than the threshold value. In addition, in the case where the elapsed time T reaches the second threshold time $T_{th2}$ (step S16: Yes), the controller 30 determines that the pump pressure flowing into the selector valve 21 is less than the threshold value regardless of the discharge pressure P detected by the pressure sensor 22. Then, in the case of determining that the pump pressure flowing into the selector valve 21 is less than the threshold value, the controller 30 executes the process of step S18.

According to the first embodiment, since the selector valve 21 is switched after the inflow pressure to the selector valve 21 is sufficiently small, it is possible to prevent damages to the hydraulic components caused by switching of the selector valve 21. Furthermore, since whether the pump pressure flowing into the selector valve 21 has fallen below the threshold value is determined using each of the conditions of steps S15 to S17, it is possible to switch the selector valve 21 without necessarily waiting until the vessel 5 is seated. As a result, the usability of the dump truck 1 is enhanced, especially in the case where the traveling operation and the dumping operation are repeatedly performed.

Note that a specific method of determining whether the pump pressure flowing into the selector valve 21 is less than the threshold value is not limited to the conditions of steps S15 to S17 illustrated in FIG. 5. Hereinafter, with reference to FIG. 6, hydraulic control processing according to a second embodiment will be described, and with reference to FIG. 7, hydraulic control processing according to a third embodiment will be described. In the following, the detailed description of the features common to those in the first embodiment will be omitted, and the focus will be on the features which are different from those of the first embodiment.

Second Embodiment

Figure 6:
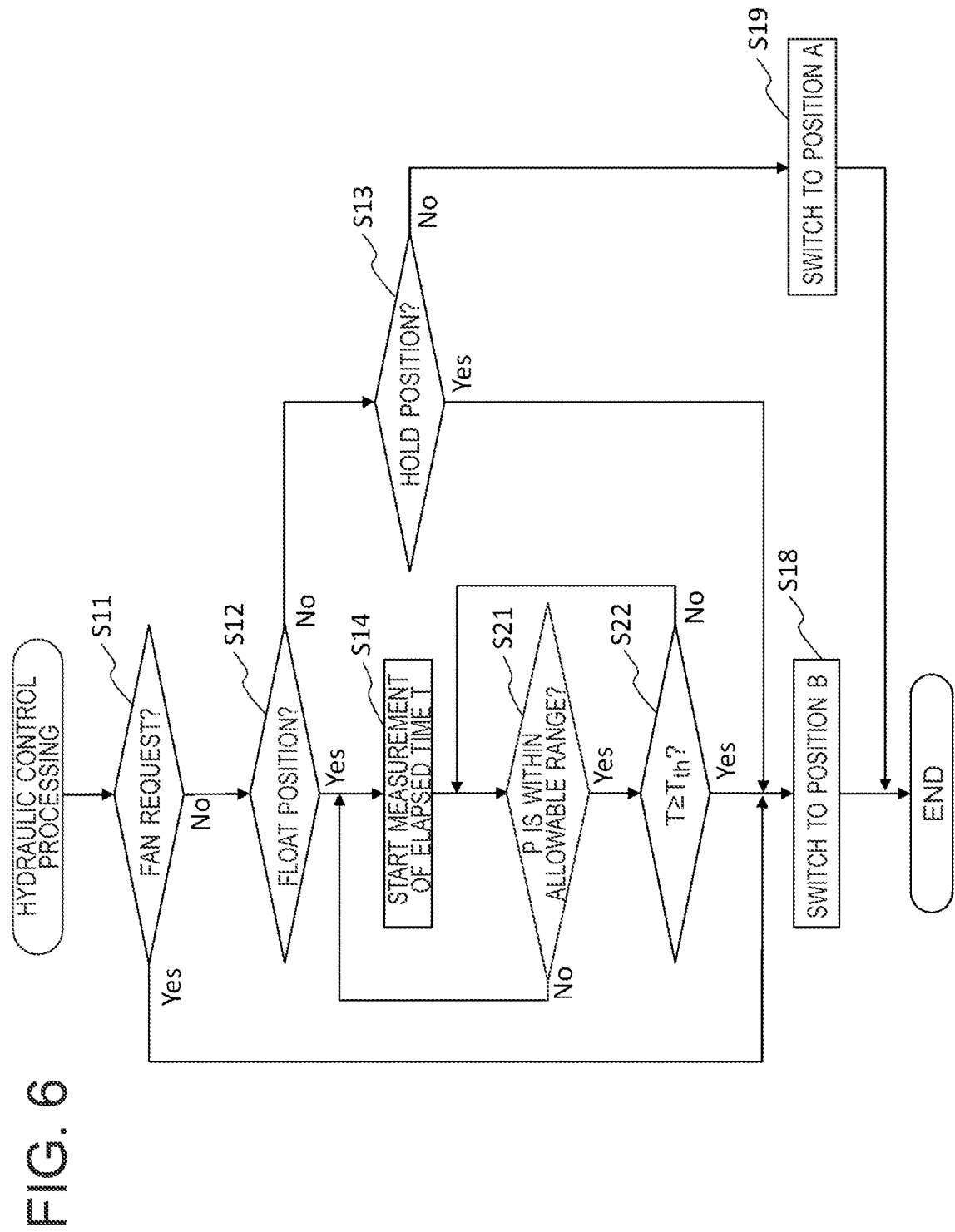
FIG. 6 illustrates a flowchart of hydraulic control processing according to a second embodiment.

FIG. 6 is a flowchart of the hydraulic control processing according to the second embodiment. In the hydraulic control processing according to the second embodiment, the method of determining whether the pump pressure flowing into the selector valve 21 is less than the threshold value (steps S21 to S22) is different from that of the first embodiment while the other processes are common to those of the first embodiment (steps S15 to S17).

After the hoist lever 9b is switched to the float position (step S12: Yes), the controller 30 according to the second embodiment starts measuring the elapsed time T (step S14). Then, the controller 30 continuously monitors whether the discharge pressure P detected by the pressure sensor 22 is within an allowable range (step S21) until the elapsed time T reaches a threshold time $T_{th}$ (step S22). The allowable range is a predetermined range (for example, 6 MPa to 8 MPa) including the threshold pressure $P_{th}$ (for example, 7 MPa) of the first embodiment. The threshold time $T_{th}$ is a time at which it can be determined that the fluctuation of the discharge pressure P detected by the pressure sensor 22 has disappeared.

Then, in the case where the discharge pressure P detected by the pressure sensor 22 continues to fall within the allowable range for the threshold time $T_{th}$ (step S21: Yes & step S22: Yes), the controller 30 determines that the pump pressure flowing into the selector valve 21 is less than the threshold value, and then executes the process of step S18. On the other hand, before the elapsed time T reaches the threshold time $T_{th}$ (step S22: No), in the case where the discharge pressure P exceeds the allowable range (step S21: No), the controller 30 resets the elapsed time T (step S14) and then executes the processes of steps S21 to S22 again.

Third Embodiment

Figure 7:
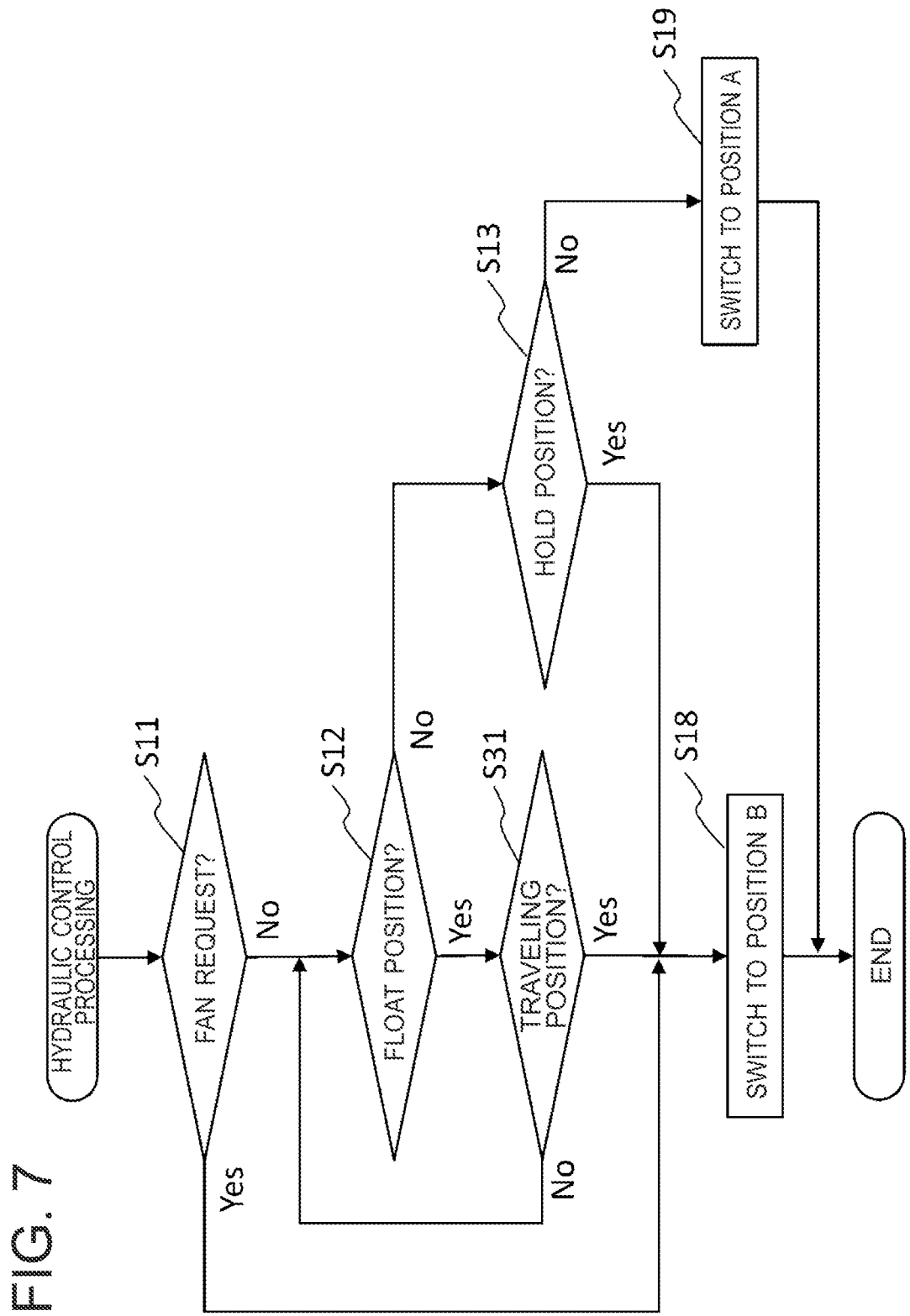
FIG. 7 illustrates a flowchart of hydraulic control processing according to a third embodiment.

FIG. 7 is a flowchart of the hydraulic control processing according to the third embodiment. In the hydraulic control processing according to the third embodiment, the method of determining whether the pump pressure flowing into the selector valve 21 is less than the threshold value (step S31) is different from that of the first embodiment while the other processes are common to those of the first embodiment (steps S15 to S17).

In the case where the hoist lever 9b is switched to the float position (step S12: Yes), the controller 30 according to the third embodiment waits for the execution of step S18 until the traveling changeover switch 9a is switched to the traveling position (forward position or reverse position) (step S31: No). Then, in the case where the hoist lever 9b is switched to the float position and the traveling switch 9a is switched to the traveling position (step S12: Yes & step S31: Yes), the controller 30 determines that the pump pressure flowing into the selector valve 21 is less than the threshold value, and then executes the process of step S18.

The same advantageous effects as those of the first embodiment can be also obtained by the hydraulic pressure control processing according to the second embodiment and third embodiment.

The embodiments described above are provided as exemplary embodiments for the purpose of describing the present invention, and it is not intended to limit the scope of the invention to only those embodiments described above. Those skilled in the art will be able to implement the invention in various other ways as long as they do not depart from the gist of the invention.

REFERENCE SIGNS LIST

1: dump truck
2: vehicle body frame (vehicle body)
3: front wheel
4: rear wheel
5: vessel
6: cab
7: hoist cylinder
7a: bottom chamber
7b: rod chamber
8 hinge pin
9a: traveling changeover switch (traveling changeover device)
9b: hoist lever (hoist operation device)
10: engine
11: output shaft
12: radiator
13: fan
14: fan motor
15: generator
16: electric circuit
17: traveling motor
18: hydraulic oil tank
19: hydraulic pump
20: regulator 21: selector valve
22: pressure sensor
30: controller
31: CPU
32: ROM
33: RAM

The invention claimed is:

1. A dump truck comprising:
a vehicle body;
an engine;
a hydraulic pump for discharging a hydraulic oil by a driving force of the engine;
a vessel supported on the vehicle body so as to be raised and lowered;
a hoist cylinder for raising and lowering the vessel by the hydraulic oil supplied from the hydraulic pump;
a radiator for transferring heat between a cooling air and a coolant to be supplied to the engine;
a fan motor for driving a fan that supplies the radiator with the cooling air by the hydraulic oil supplied from the hydraulic pump;
a selector valve capable of being switched between positions of a first position for supplying the hoist cylinder with the hydraulic oil discharged from the hydraulic pump and a second position for supplying the fan motor with the hydraulic oil discharged from the hydraulic pump; and
a controller configured to control the positions in the selector valve,
wherein
the controller is configured to:
in a case where the selector valve is in the first position, determine whether an inflow pressure of the hydraulic oil flowing into the selector valve is less than a threshold value, and
in a case of determining that the inflow pressure is less than the threshold value, switch the selector valve from the first position to the second position.

2. The dump truck according to claim 1, further comprising:
a hoist operation device capable of being switched between positions of an up position for supplying the hoist cylinder with the hydraulic oil in a direction for raising the vessel, a down position for supplying the hoist cylinder with the hydraulic oil in a direction for lowering the vessel, and a float position for lowering the vessel by its own weight;
a regulator for increasing or decreasing a discharge capacity of the hydraulic pump depending on the positions in the hoist operation device; and
a pressure sensor for detecting a discharge pressure of the hydraulic oil discharged from the hydraulic pump,
wherein the controller is configured to:
measure an elapsed time after the hoist operation device is switched to the float position; and
in a case where the elapsed time reaches a first threshold time and the discharge pressure detected by the pressure sensor is less than a threshold pressure, determine that the inflow pressure is less than the threshold value.

3. The dump truck according to claim 2, wherein
the controller is configured to, in a case where the elapsed time reaches a second threshold time longer than the first threshold time, determine that the inflow pressure is less than the threshold value regardless of the discharge pressure detected by the pressure sensor.

4. The dump truck according to claim 1, further comprising:
a hoist operation device capable of being switched between positions of an up position for supplying the hoist cylinder with the hydraulic oil in a direction for raising the vessel, a down position for supplying the hoist cylinder with the hydraulic oil in a direction for lowering the vessel, and a float position for lowering the vessel by its own weight;
a regulator for increasing or decreasing a discharge capacity of the hydraulic pump depending on the positions in the hoist operation device; and
a pressure sensor for detecting a discharge pressure of the hydraulic oil discharged from the hydraulic pump,
wherein the controller is configured to, after the hoist operation device is switched to the float position, in a case where the discharge pressure detected by the pressure sensor continues to fall within an allowable range for a threshold time, determine that the inflow pressure is less than the threshold value.

5. The dump truck according to claim 1, further comprising:
a hoist operation device capable of being switched between positions of an up position for supplying the hoist cylinder with the hydraulic oil in a direction for raising the vessel, a down position for supplying the hoist cylinder with the hydraulic oil in a direction for lowering the vessel, and a float position for lowering the vessel by its own weight;
a regulator for increasing or decreasing a discharge capacity of the hydraulic pump depending on the positions in the hoist operation device;
a generator for generating power by the driving force of the engine;
a traveling motor for causing the vehicle body to travel by the power generated by the generator, and
a traveling changeover device capable of being switched between positions of a traveling position for supplying the traveling motor with the power and a neutral position for stopping supplying the traveling motor with the power,
wherein the controller is configured to, in a case where the hoist operation device is switched to the float position and the traveling changeover device is switched from the neutral position to the traveling position, determine that the inflow pressure is less than the threshold value.

* * * * *